US008502824B2

(12) United States Patent
Shen et al.

(10) Patent No.: US 8,502,824 B2
(45) Date of Patent: Aug. 6, 2013

(54) METHOD AND DISPLAY DEVICE FOR DISPLAYING CHARACTERS

(75) Inventors: Yilin Shen, Shanghai (CN); Lingyan Bao, Shanghai (CN); Shih-Kuang Tsai, Shanghai (CN)

(73) Assignee: Inventec Appliances (Shanghai) Co., Ltd., Taipei Hsien (TW)

( * ) Notice: Subject to any disclaimer, the term of this patent is extended or adjusted under 35 U.S.C. 154(b) by 866 days.

(21) Appl. No.: 12/649,003

(22) Filed: Dec. 29, 2009

(65) Prior Publication Data

US 2010/0271387 A1    Oct. 28, 2010

(30) Foreign Application Priority Data

Apr. 28, 2009  (CN) .......................... 2009 1 0050161

(51) Int. Cl.
| *G06T 11/40* | (2006.01) |
| *G06T 11/80* | (2006.01) |
| *G06T 15/40* | (2011.01) |
| *G06T 11/20* | (2006.01) |
| G06T 3/00 | (2006.01) |
| G06T 3/40 | (2006.01) |

(52) U.S. Cl.
CPC ............... *G06T 11/203* (2013.01); *G06T 11/20* (2013.01); *G06T 3/00* (2013.01); *G06T 3/40* (2013.01)
USPC ........... 345/467; 345/468; 345/472; 345/441; 345/611; 345/629

(58) Field of Classification Search
CPC  G06T 11/203; G06T 11/20; G06T 3/00; G06T 3/40
USPC ................ 345/467, 468, 472, 441, 611, 442, 345/629
See application file for complete search history.

(56) References Cited

U.S. PATENT DOCUMENTS

| 5,155,813 | A | * | 10/1992 | Donoghue et al. ............ 345/179 |
| 5,319,395 | A | * | 6/1994 | Larky et al. .................... 345/605 |
| 5,454,046 | A | * | 9/1995 | Carman, II .................... 382/186 |
| 5,557,297 | A | * | 9/1996 | Sharp et al. ................... 345/614 |
| 5,730,602 | A | * | 3/1998 | Gierhart et al. ............... 434/155 |
| 5,777,700 | A | * | 7/1998 | Kaneko et al. .................. 349/39 |
| 5,899,550 | A | * | 5/1999 | Masaki ......................... 349/109 |
| 7,054,490 | B2 | * | 5/2006 | Sakaue et al. ................. 382/205 |
| 8,081,187 | B2 | * | 12/2011 | Perani et al. .................. 345/441 |
| 2001/0004276 | A1 | * | 6/2001 | Urabe et al. ................... 349/106 |
| 2002/0063747 | A1 | * | 5/2002 | Van Der Meijs et al. ....... 347/19 |
| 2002/0122086 | A1 | * | 9/2002 | Matsubara et al. ............ 347/12 |

(Continued)

*Primary Examiner* — Javid A Amini
(74) *Attorney, Agent, or Firm* — McDermott Will & Emery LLP

(57) ABSTRACT

A method is used to control a liquid crystal panel to display a character having a tilted or curved stroke. The liquid crystal panel includes a plurality of original physical pixels arranged in a matrix array. The method includes dividing each original physical pixel into three color dots of red, green and blue, and forming a plurality of display units. Each display unit includes three horizontally consecutive color dots, and at least one of the plurality of display units includes color dots from two of the original physical pixels. The method includes constructing a clear lattice diagram including the plurality of display units for displaying the tilted or bended stroke, and driving the liquid crystal panel to display the character based on the clear lattice diagram. As such, in the clear lattice diagram, at least two of the display units are vertically adjacent to each other and are horizontally offset by one or two color dots with respect to each other.

16 Claims, 10 Drawing Sheets

U.S. PATENT DOCUMENTS

| | | | |
|---|---|---|---|
| 2003/0123002 A1* | 7/2003 | Kawase | 349/113 |
| 2004/0012815 A1* | 1/2004 | Fuchigami | 358/2.1 |
| 2006/0256355 A1* | 11/2006 | Karito | 358/1.9 |
| 2007/0188813 A1* | 8/2007 | Ozawa | 358/3.21 |
| 2007/0222924 A1* | 9/2007 | Kawase | 349/113 |
| 2008/0117214 A1* | 5/2008 | Perani et al. | 345/441 |
| 2009/0097765 A1* | 4/2009 | Kimura et al. | 382/243 |
| 2009/0128857 A1* | 5/2009 | Shiraishi | 358/3.03 |
| 2009/0213054 A1* | 8/2009 | Masui | 345/88 |
| 2010/0060703 A1* | 3/2010 | Ohara et al. | 347/102 |
| 2011/0113366 A1* | 5/2011 | Cheong et al. | 715/806 |
| 2011/0305393 A1* | 12/2011 | Nijemcevic et al. | 382/182 |
| 2012/0133991 A1* | 5/2012 | Monga et al. | 358/3.06 |

* cited by examiner

| A1,1 | A1,2 | A1,3 | A1,4 |
|------|------|------|------|
| A2,1 | A2,2 | A2,3 | A2,4 |
| A3,1 | A3,2 | A3,3 | A3,4 |
| A4,1 | A4,2 | A4,3 | A4,4 | ns
METHOD AND DISPLAY DEVICE FOR DISPLAYING CHARACTERS

BACKGROUND

1. Technical Field

The present invention relates to methods for displaying characters. Specifically, the present invention relates to methods and display devices for displaying characters having tilted or curved strokes.

2. Discussion of Related Art

FIG. 1 illustrates two Chinese characters displayed on a liquid crystal panel by using the traditional display control method. As shown in FIG. 1, it is quite clear that the display effect of the left character is good. However, the display effect of the right character is quite poor, which has blur and sawtooth phenomenon.

With reference to FIGS. 2-4, the specific reasons for the blur and sawtooth phenomenon are discussed below. FIG. 2 illustrates a partial view of the liquid crystal panel, wherein letter Aij (i=1, 2, 3, . . . ; j=1, 2, 3, . . . ) represents a physical pixel in row i and column j. It can be seen from FIG. 2 that all physical pixels are orderly arranged in rows and columns to form a pixel array, such as a conventional 1024×768 pixel array. Such liquid crystal panels are called as the matrix-arrayed liquid crystal panels. Conventional display control methods construct characters based on such matrix-arrayed pixels.

FIG. 3 illustrates a schematic view of using a conventional display control method to display horizontal lines and vertical lines on a liquid crystal panel. As shown in FIG. 3, the conventional display control method uses original physical pixels as units and displays high-quality horizontal lines and vertical lines. Therefore, it can display the characters mainly consisting of horizontal and vertical strokes, such as the left character shown in FIG. 1 with a relatively satisfactory effect.

FIG. 4 illustrates a schematic view of using the conventional display control method to display tilted lines on a liquid crystal panel. As shown in FIG. 4, the traditional display control method can only use orderly arranged original physical pixels as units to form titled lines. As such, in the tilted lines shown in FIG. 4, the display units vertically adjacent to each other are horizontally offset by a width of at least one physical pixel, which causes a more sawtooth or blur phenomenon. As a result, the traditional display control method can not desirably display characters having tilted strokes, such as the left character shown in FIG. 1.

DETAILED DESCRIPTION

In the exemplary embodiments described below, a tilted/curved stroke of a character is illustrated and discussed for illustrating how to improve the display definition of a stroke and how to construct a clear lattice diagram of the stroke. However, it should be understood that the present invention may also apply to other tilted/curved strokes for improving the display definitions thereof.

Figures 1, 2:
FIG. 1 illustrates two Chinese characters displayed on a crystal liquid panel by using a conventional construction method.
FIG. 2 illustrates a partial structural diagram of a liquid crystal panel.
Figure 3:
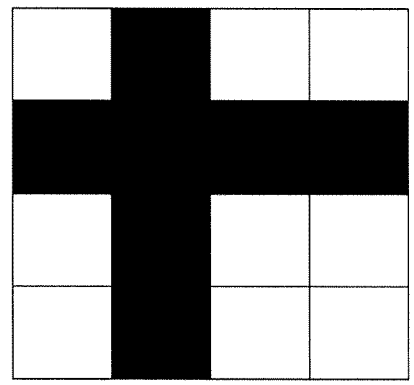
FIG. 3 illustrates a schematic view of horizontal lines and vertical lines displayed on a liquid crystal panel by a conventional display control method.
Figure 4:
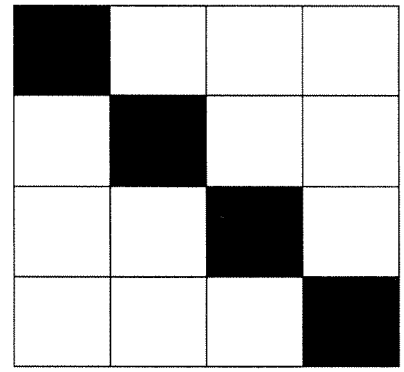
FIG. 4 illustrates a schematic view of tilted lines displayed on a liquid crystal panel by a conventional construction method.
Figure 5:
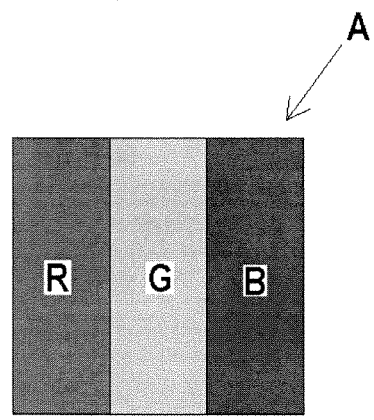
FIG. 5 illustrates an enlarged view of each physical pixel of a liquid crystal panel.

FIG. 5 illustrates an enlarged or magnified structural diagram of a physical pixel A of a liquid crystal panel. The physical pixel A is formed by three horizontally consecutive positioned color dots of red R, green G and blue B.

Figure 6:
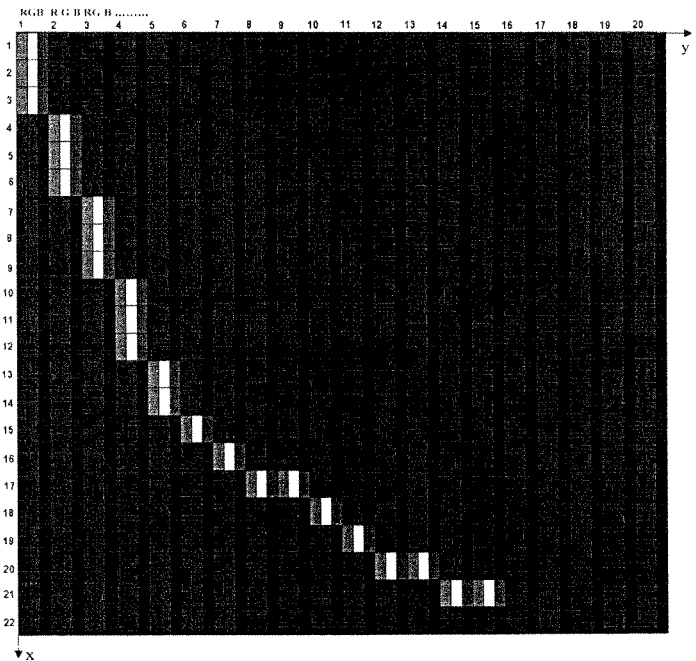
FIG. 6 illustrates an untreated lattice diagram of a tilted/curved stroke constructed using a conventional construction method.

FIG. 6 illustrates an untreated lattice diagram of a tilted or curved stroke constructed using a conventional construction method. As shown in FIG. 6, the conventional construction method uses the original physical pixels as units to construct and illustrate the stroke. Therefore, the average height of the sawtooth or blur is at least one physical pixel, so that the display effect of the stroke is not good. In addition, headings "RGBRGB . . . " repeating the color sequence Red, Green, Blue toward the right direction to represent each same color of each column of color dots from the leftmost to the rightmost columns, are included in FIGS. 6-10 to clarify the meaning of FIGS. 6-10.

Figure 7:
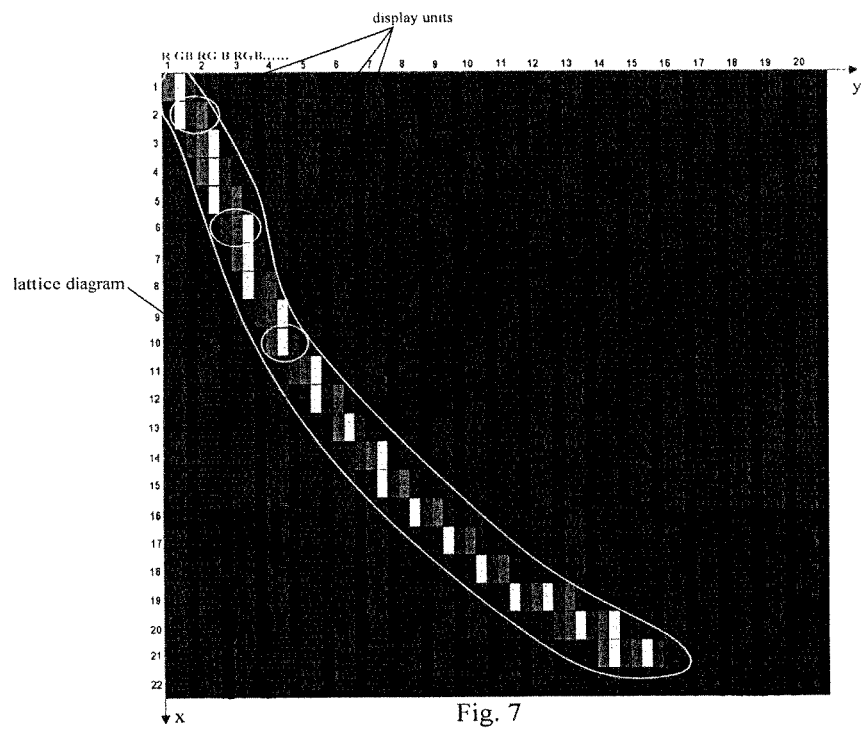
FIG. 7 illustrates a clear lattice diagram of the tilted/curved stroke constructed using a first exemplary construction method of the present invention.

FIG. 7 illustrates a clear/treated lattice diagram of the stroke constructed using a first exemplary construction method of the present invention. In FIG. 7, the first construction method divides each pixel of the liquid crystal panel into three color dots of red, green and blue, and may use any three horizontally consecutive color dots as a display unit to form the stroke. As such, at least some of the display units which are vertically adjacent to or next to each other are horizontally offset by one or two color dots with respect to each other. As a result thereof, the sawtooth and blur phenomenon is reduced and the display effect is improved.

Figure 8:
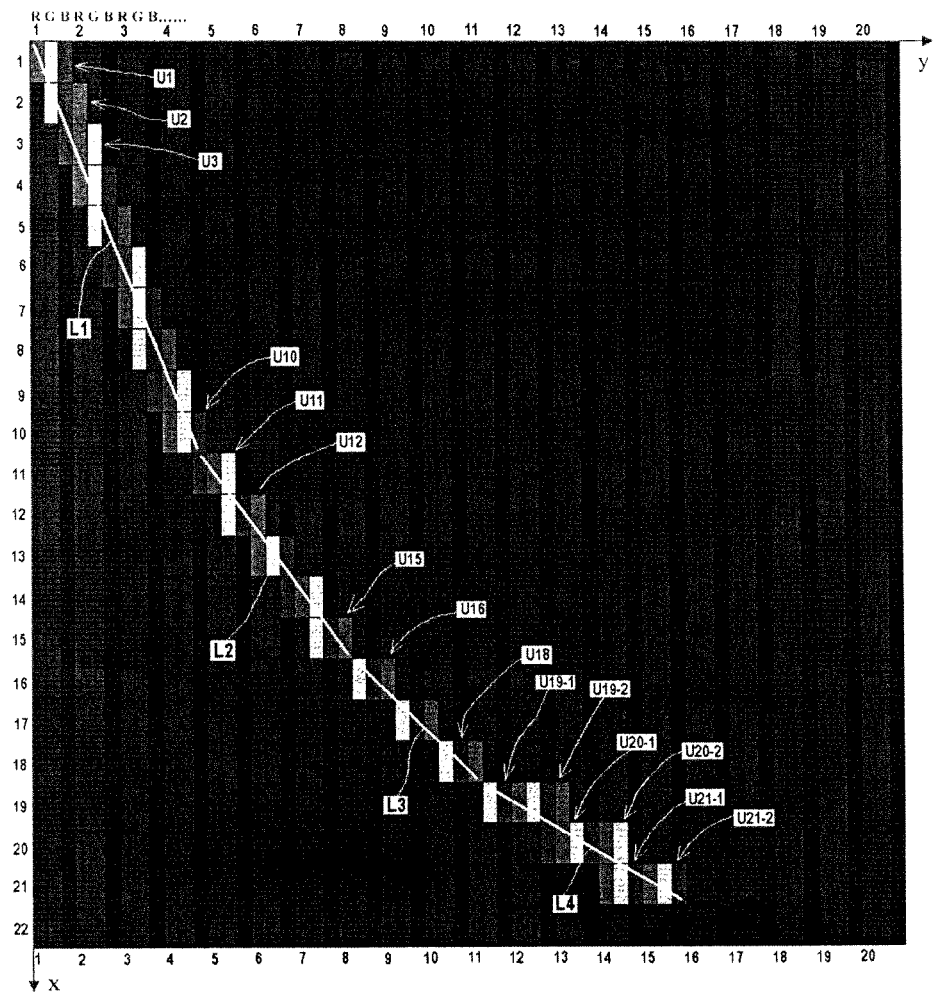
FIG. 8 is a schematic view of the tilted/curved stroke shown in FIG. 7 which is formed by a plurality of straight line segments.

FIG. 8 is a schematic view of the stroke shown in FIG. 7 which is constructed by a plurality of straight line segments. Specifically, four straight line segments L1, L2, L3 and L4 are used to form the stroke in the embodiment illustrated in FIG. 8.

In the illustrated embodiment, the straight line segment L1 is formed by ten display units U1 to U10, and every two display units which are vertically adjacent to each other are horizontally offset by one color dot. For example, the display units U1 and U2 are horizontally offset by a distance of one color dot. The display unit U1 is formed by three horizontally consecutive color dots of red R, green G and blue B. That is to say the display unit U1 is formed by an original physical pixel A(1, 1) (hereinafter "A" denotes a pixel and the coordinates of a pixel are indicated by (x, respectively located on the x and y axes drawn in FIGS. 6-10). The display unit U2 is formed by three horizontally consecutive color dots green G, blue B and red R, wherein two color dots of green G and blue B belong to an original physical pixel A(2, 1), and the color dot of red R belongs to an original physical pixel A(2, 2). It can be seen that the display unit U2 is not formed from one original physical pixel. Instead, the display unit U2 is formed by two color dots of green G and blue B from the original physical pixel A(2, 1), and the color dot of red R from the original physical pixel A(2, 2).

The straight line segment L2 is formed by five display units U11 to U15, and any two display units which are vertically adjacent to or next to each other are horizontally offset by a distance of two color dots. For example, the display units U11 and U12 are offset by a distance of two color dots horizontally. The display unit U11 is formed by three horizontally consecutive color dots blue B, red R and green G, wherein the color dot blue B belongs to an original physical pixel A(11, 4), and two color dots red R and green G belong to an original physical pixel A(11, 5). It can be seen that the display unit U11 is not formed from one original physical pixel. Instead, the display unit U11 is formed by the color dot blue B from the original physical pixel A(11, 4) and two color dots red R and green G from the original physical pixel A(11, 5). The display unit U12 is formed by three horizontally consecutive positioned color dots green G, blue B and red R, wherein two color dots green G and blue B belong to an original physical pixel A(12, 5), and the red color dot R belongs to an original physical pixel (12, 6). It can be seen that the display unit U12 is not formed from one original physical pixel. Instead, the display unit U12 is formed by two color dots green G and blue B from the original physical pixel A(12, 5) and the color dot red R from the original physical pixel A(12, 6).

The straight line segment L3 is formed by three display units U16 to U18, and any two display units which are vertically adjacent to each other are horizontally offset by a distance of three color dots. Additionally, each of display units U16 to U18 is formed by three horizontally consecutive color dots green G, blue B and red R.

The straight line segment L4 is formed by six display units U19-1, U19-2, U20-1, U20-2, U21-1 and U21-2. As shown in FIG. 8, the display units U19-1 and U19-2 are consecutively located in the same row horizontally, and form a large display unit U19. The display units U20-1 and U20-2 are horizontally and consecutively located in the same row, and form a large display unit U20. Similarly, the display units U21-1 and U21-2 are horizontally and consecutively located in the same row, and form a large display unit U21. The large display units U19, U20 and U21 are horizontally offset by a distance of four color dots.

In an exemplary embodiment, the four straight line segments L1-L4 shown in FIG. 8 are automatically determined by a method described below. The top of the titled/curved stroke is initially treated as a start point of a first tilted line segment. A slope is calculated for each straight line connecting each two adjacent points of titled/curved stroke. As such, each two adjacent points have a corresponding slope, and a comparison is conducted for every two adjacent slopes in turn. When the difference between a current slope and a previous slope is greater than a predetermined threshold, the upper point corresponding to the current slope will be treated as the end point of the first tilted line segment. The first tilted line segment is then formed by the points having similar slopes. The lower point corresponding to the current slope will be treated as the new start point of a new tilted line segment. A comparison for the slopes of the points under the new start points is conducted in a similar way for determining the end point of the new titled line segment. Therefore, the slopes of the first straight line segment are about the same, and different straight and tilted line segments may have relatively different slopes.

Take FIG. 8 for instance, the tilted/curved stroke may be divided into four straight line segments. The first straight line segment L1 is from U1 to U10. The slope of the line segment U1 makes every row offset by a distance of one color dot. The second straight line segment L2 is from U11 to U15, and its slope makes every row offset by a distance of two color dots. The third straight line segment L3 is from U16 to U18, and its slope makes every row offset exactly by one complete original physical pixel, i.e. three color dots. The fourth straight line segment L4 is from U19 to U22, and its slope makes every row offset by a distance of four color dots.

According to such division, the slope of the straight line segment L1 can be calculated as:

$$\frac{n \times h}{(n+2) \times w}.$$

Wherein h represents a height of each color dot, w represents a width of each color dot, n represents a total number of rows the straight line segment L1 covers. In the illustrated embodiment, n is 10. This slope makes every row offset by one color dot.

The slope of the straight line segment L2 is:

$$\frac{m \times h}{(3m-1) \times w}.$$

Wherein h represents a height of each color dot, w represents a width of each color dot, m represents a total number of rows the straight line segment L2 covers. In the illustrated embodiment, m is 5. This slope makes every row offset by two color dots.

The slope of the straight line segment L3 is:

$$\frac{k \times h}{k \times w}.$$

Wherein h represents a height of each color dot, w represents a width of each color dot, k represents a total number of rows the straight line segment L3 covers. In the illustrated embodiment, k is 3. This slope makes every row offset exactly by one complete original physical pixel.

The slope of the straight line segment L4 is:

$$\frac{f \times h}{(4f+2) \times w}.$$

Wherein h represents a height of each color dot, w represents a width of each color dot, f represents a total number of rows the straight line segment L4 covers. In the illustrated embodiment, f is 5. This slope makes every row offset by four color dots.

In the embodiment illustrated in FIGS. 5-8, four straight line segments L1, L2, L3 and L4 having different slopes are used to form the stroke, and the slopes of the line segments L1-L4 change gradually. However, it should be understood that, the illustrated stroke may also be formed by different number of straight line segments when different threshold is adopted for dividing the straight line segments. As such, the number of straight line segments may decrease or increase in different embodiments. When each original physical pixel of a liquid crystal panel is divided into three color dots of red, green and blue, and any three horizontally consecutive color dots may be used as a display unit, the straight line segment L1 with a slope of $$\frac{n \times h}{(n+2) \times w}$$

or the straight line segment L2 with a slope of $$\frac{m \times h}{(3m-1) \times w}$$

can be formed.

Figure 9:
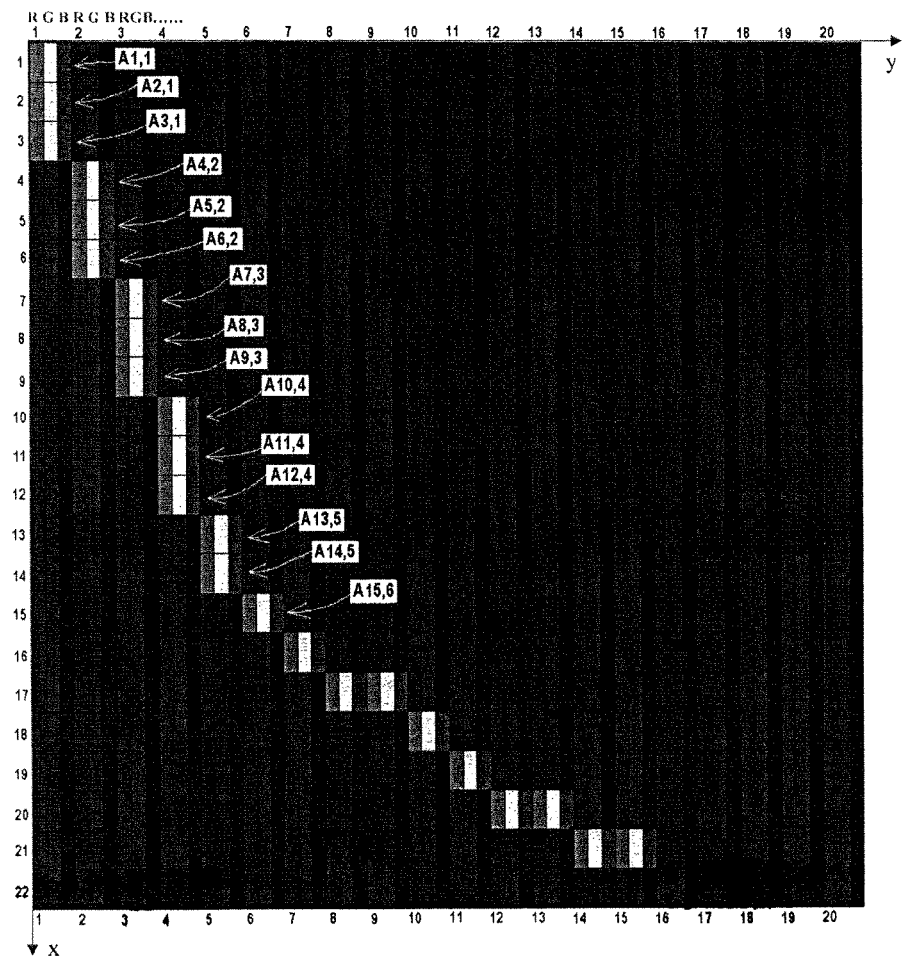
FIG. 9 illustrates a marked diagram of the conventional or untreated lattice diagram of the tilted/curved stroke shown in FIG. 6.
Figure 10:
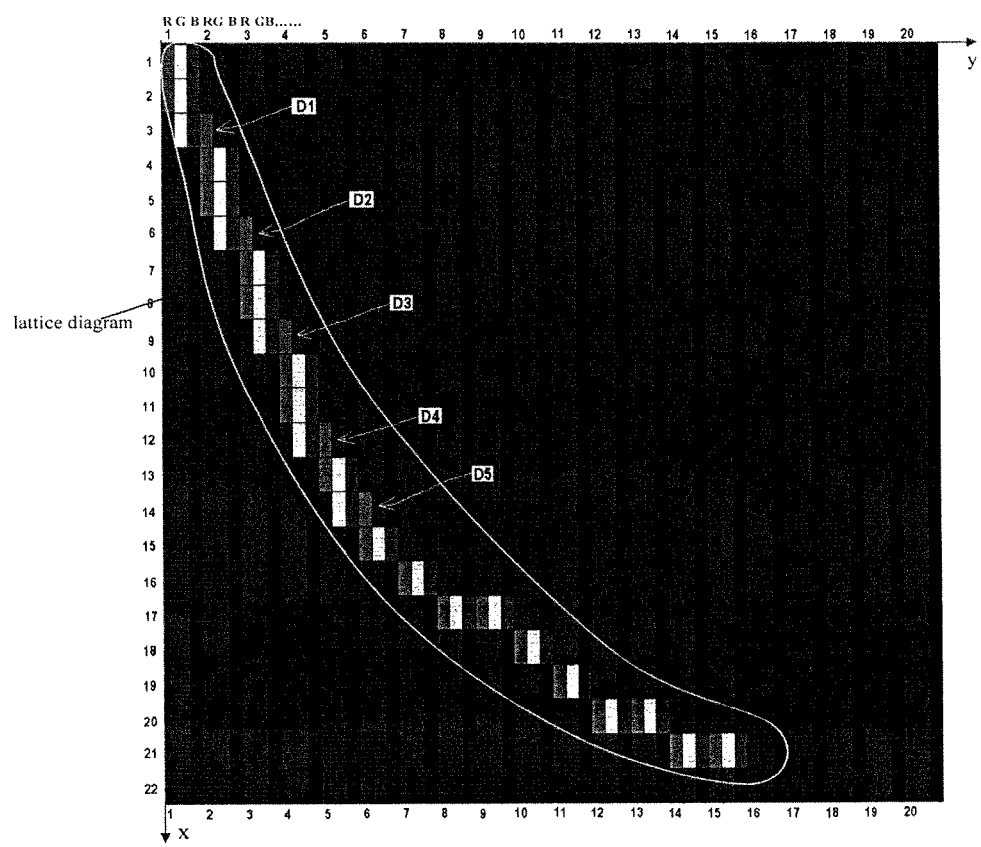
FIG. 10 illustrates a clear lattice diagram of the tilted/curved stroke constructed using a second exemplary construction method of the present invention.

FIGS. 9-10 illustrate a second embodiment to form the tilted or curved stroke. Specifically, FIG. 9 illustrates a marked diagram of the conventional/untreated lattice diagram of the stroke shown in FIG. 6. FIG. 10 illustrates a clear/treated lattice diagram of the stroke constructed using a second exemplary construction method of the present invention.

As shown in FIG. 9, an original physical pixel A(3, 1) and an original physical pixel A(2, 1) which are used to display the stroke are horizontally aligned with each other, and are horizontally offset with respect to an original physical pixel A(4, 2) by a distance of one physical pixel. As such, based on the original lattice diagram shown in FIG. 6, by rightward shifting the original physical pixel A(3, 1) by one color dot to the position of a display unit D1 shown in FIG. 10, the display unit D1 may replace the original physical pixel A(3, 1). As shown in FIG. 10, after shifting, the display unit D1 (the shifted physical pixel A(3, 1)) and the original physical pixel A(4, 2) are horizontally offset by a distance of two color dots, so that sawtooth and blur phenomenon is reduced and the displaying definition is improved.

Specifically, the display unit D1 is not an original physical pixel of color dots red R, green G and blue G. Instead, the display unit D1 is formed by three horizontally consecutive color dots green G, blue B and red R, wherein two color dots green G, blue B belong to the original physical pixel A(3, 1), and the red color dot R belongs to the original physical pixel A(3, 2).

Similarly, an original physical pixel A(6, 2) is shifted rightward by one color dot to the position of a display unit D2 shown in FIG. 10, and the original physical pixel A(6, 2) is replaced by the display unit D2.

An original physical pixel A(9, 3) is shifted rightward by one color dot to the position of a display unit D3 shown in FIG. 10, and the original physical pixel A(9, 3) is replaced by the display unit D3.

An original physical pixel A(12, 4) is shifted rightward by one color dot to the position of a display unit D4 shown in FIG. 10, and the original physical pixel A(12, 4) is replaced by the display unit D4.

An original physical pixel A(14, 5) is shifted rightward by one color dot to the position of a display unit D5 of FIG. 10, and the original physical pixel A(14, 5) is replaced by the display unit D5.

Referring to the clear lattice diagram of stroke formed through shifting, the display effect of FIG. 10 is better than the effect of FIG. 6 which is constructed using the conventional construction method. Moreover, it is easier and more convenient to form the stroke by using the shifting and modifying method based on the conventional/untreated lattice diagram than by using multiple straight line segments.

Although the original physical pixels A(3, 1), A(6, 2), A(12, 4) and A(14, 5) are respectively shifted rightward by one color dot. It should be understood that, the original physical pixels A(3, 1), A(6, 2), A(12, 4) and A(14, 5) may also be shifted rightward by two color dots or may be alternately shifted by one or two color dots in other embodiments.

Figure 11A:
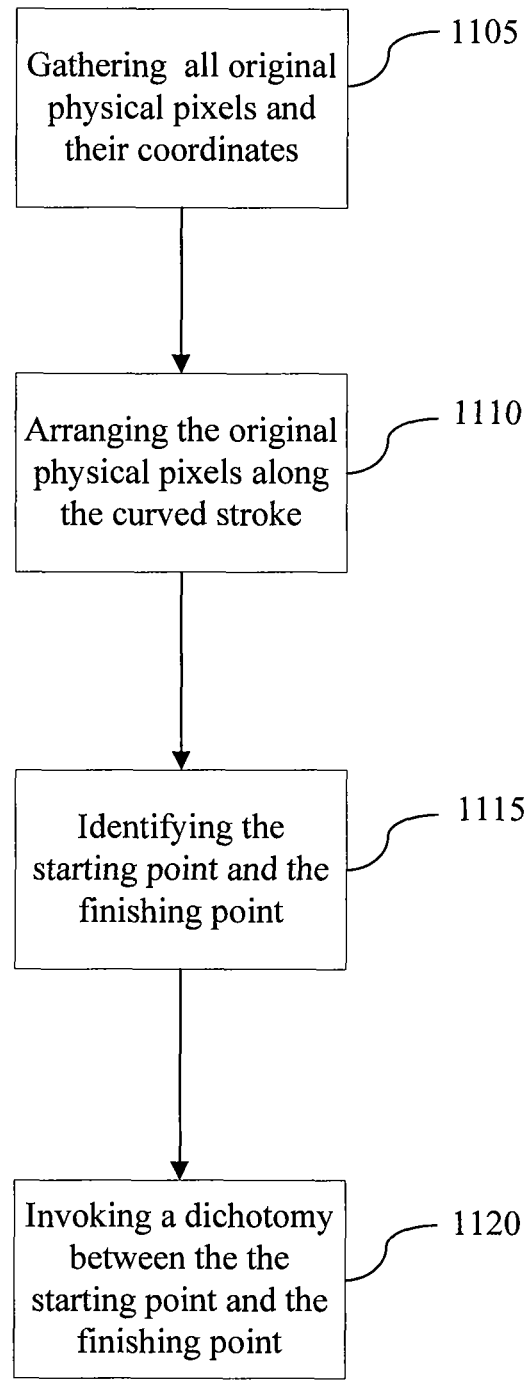
FIGS. 11(a) and 11(b) illustrate a flowchart of constructing tilted/curved strokes by using another exemplary construction method.
Figure 11B:
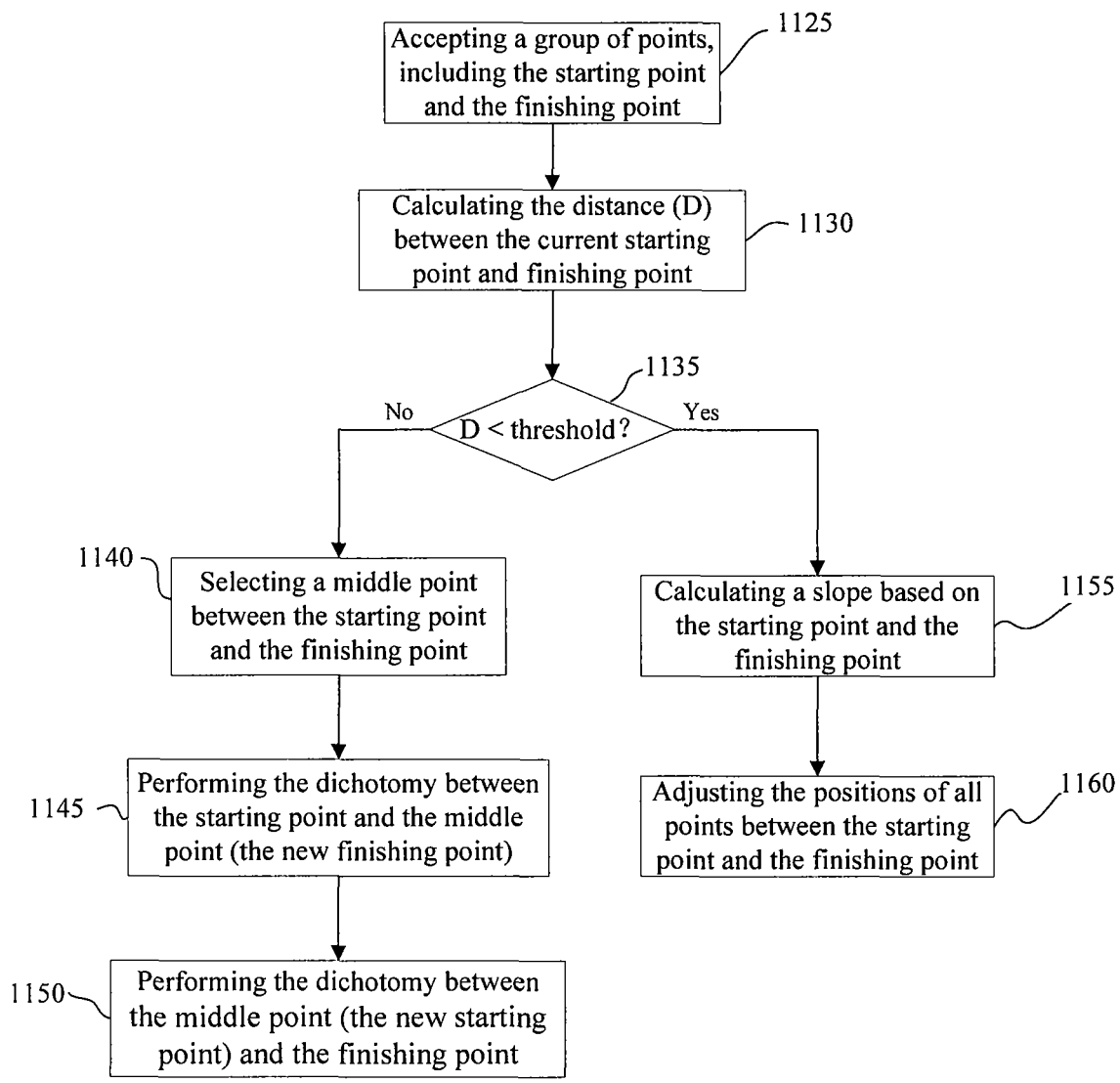

FIGS. 11(a) and 11(b) illustrate an exemplary method to form a tilted or curved stroke using dichotomy. In FIG. 11(a), in a step 1105, the process records coordinates of all original physical pixels of the original strokes. In a step 1110, the process arranges those recorded coordinates in order. For example, with reference to FIG. 9, such order is (1, 1), (2, 1), (3, 1), (4, 2), (5, 2), (6, 2) . . . (21, 15). In a step 1115, the process takes the coordinates of the starting point and the finishing point from the order generated. In the embodiment illustrated in FIG. 9, the coordinate of the starting point is (1, 1) and the coordinate of the finishing point is (21, 15). In a step 1120, the process invokes a dichotomy described in FIG. 11(b) by taking the coordinates of all points between the starting point and the finishing point (including the starting point and the finishing point) as parameters.

In FIG. 11(b), in a step 1125, the dichotomy accepts a group of points, including the starting point and the finishing point. In a step 1130, the process calculates the distance between the current starting point and finishing point as a distance (D). In a step 1135, the process determines whether the calculated distance is less than a predetermined threshold distance. If the calculated distance is less than the predetermined threshold, the process goes to a step 1155 and calculates the slope of the line connected from the current starting point and finishing point. According to the calculated slope, a step 1160 adjusts the positions of all points between the starting point and the finishing point, so that the slope of every two points vertically adjacent to each other can be close to the calculated slope value as much as possible.

If the calculated distance value is determined larger than the predetermined threshold at the step 1135, it indicates that the distance between the starting point and the finishing point is too long. As such, it is not suitable to calculate the average slope value, based on which the position of the middle point is adjusted. Under such circumstance, the process goes to a step 1140 and selects a middle point between the starting point and the finishing point. As such, the middle point divides all points between the starting point and the finishing point into two segments. The first segment is from the starting point to the middle point. The second segment is from the middle point to the finishing point. The dichotomy may be conducted on each segment. In a step 1145, the process performs the dichotomy on the starting point, the middle point (the new finishing point) and all points between the two points. In a step 1150, the process performs the dichotomy on the middle point (the new starting point), the finishing point and all points between the two points. This process is recursively carried out until the dichotomy is conducted on every point.

Figure 12:
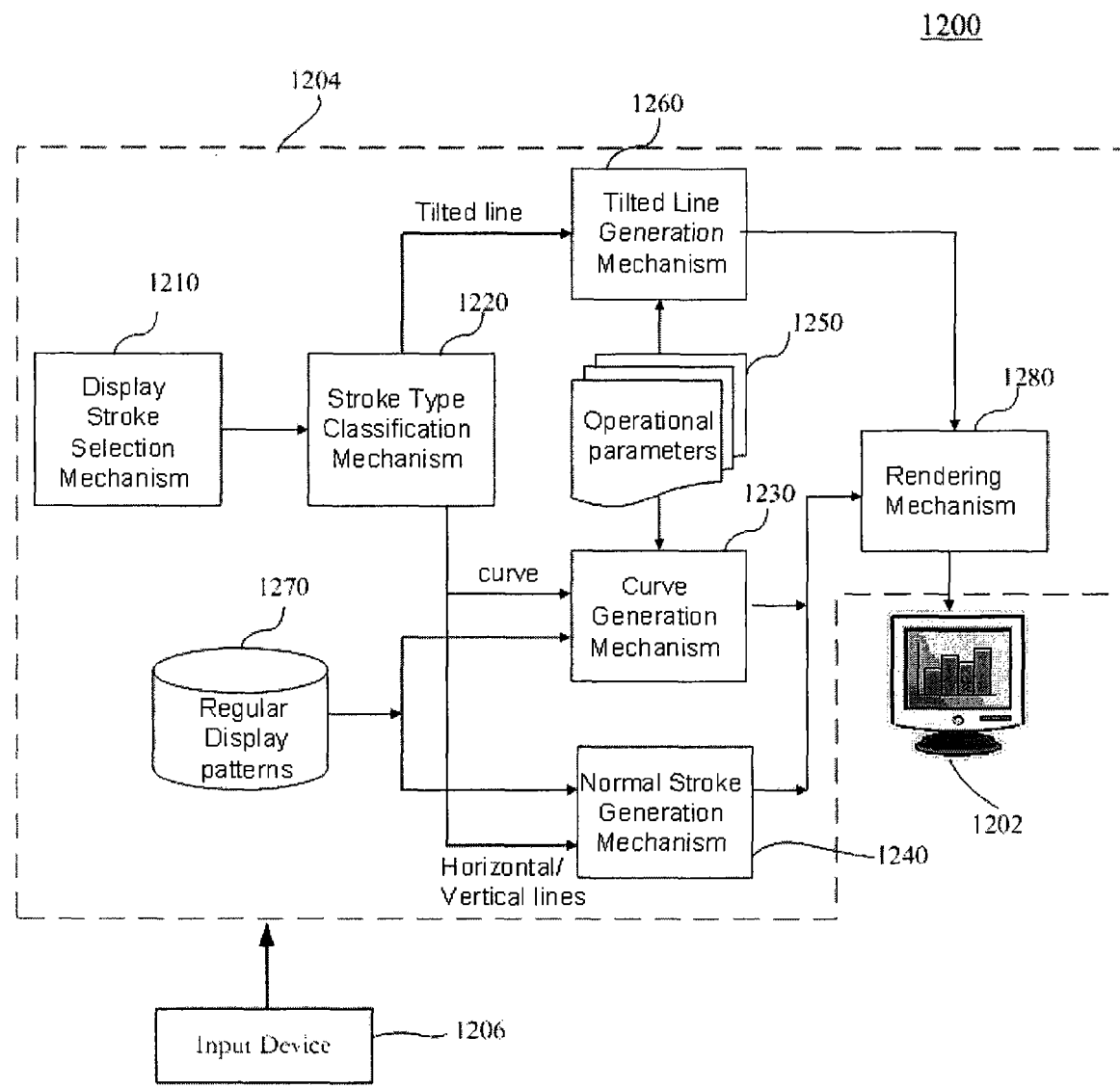
FIG. 12 illustrates a diagram of an exemplary computer system for realizing the construction method.

FIG. 12 illustrates a diagram of an exemplary computer system 1200 for realizing the stroke construction methods of the present invention. The computer system 1200 includes a liquid crystal panel 1202, a main unit 1204 and an input device/system 1206. When displaying characters, a display stroke selection unit 1210 first determines the stroke to be displayed, and then the selected stroke to be displayed will be transmitted to a stroke type classification unit 1220 to conduct classification. If the stroke to be displayed is a tilted line, a tilted line generation unit 1260 is invoked to perform a clear treatment process. If the stroke to be displayed is a curve, curve generation unit 1230 will be invoked to perform a clear treatment process. The clear treatment process performed by the tilted line generation unit 1260 and/or the curve generation unit 1230 may be based on one of the exemplary construction methods described above. During such a clear treatment process, the tilted line generation unit 1260 and the curve generation unit 1230 may invoke various invokable parameters stored in a database 1250 as controlled by the system to conduct specific operations. Such parameters may be flexibly adjusted according to application needs. For instance, the adopted threshold may be adjusted based on the size of the character.

If the stroke to be displayed is neither a tilted line nor a curved line, an ordinary or normal stroke generation unit 1240 may be invoked for displaying. Such ordinary display may be accelerated by invoking already stored regular display pattern, such as the conventional/untreated lattice diagram stored in a database 1270. Different stroke types will be generated by the different generation units (1230, 1240, 1260) and will be transmitted to a drawing unit 1280 to be specifically displayed on a display screen 1290.

Figure 13:
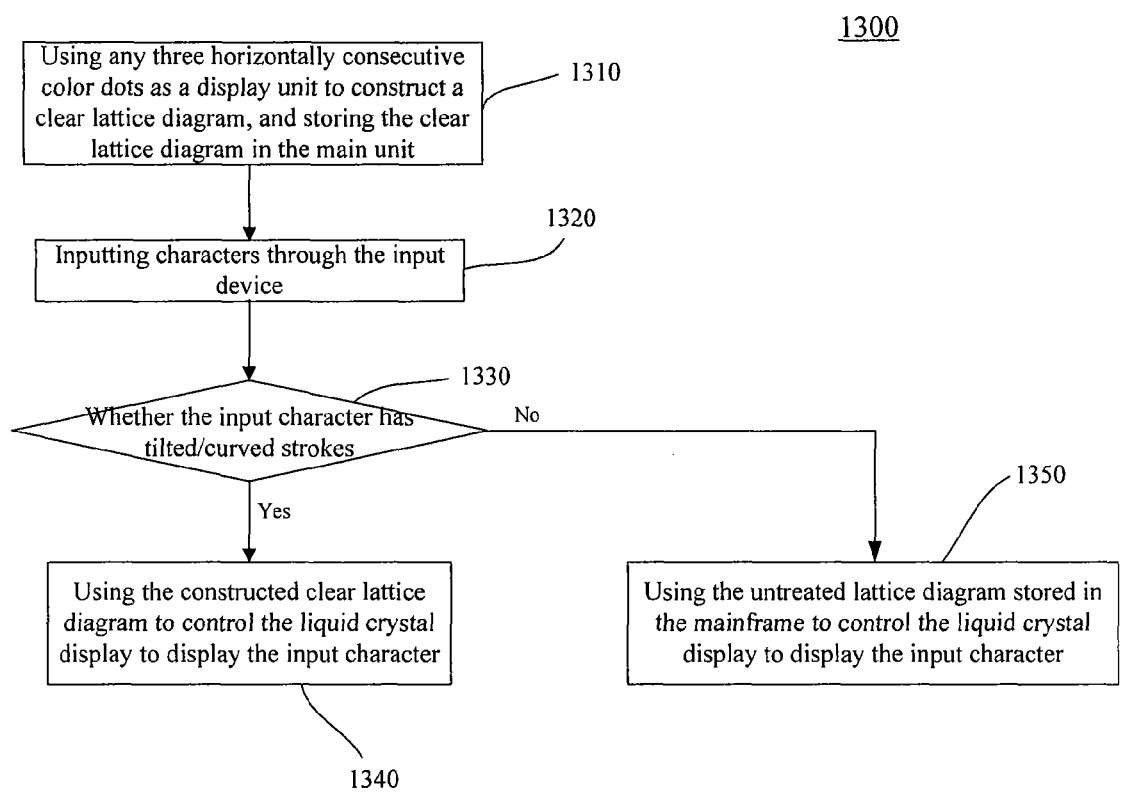
FIG. 13 illustrates a flowchart of an exemplary display control method for displaying characters on a computer system.

FIG. 13 illustrates a flow chart of an exemplary display control method 1300 for displaying characters in a computer system, such as the computer system 1200 illustrated in FIG. 12.

As shown in FIG. 13, in a step 1310, the process divides each original physical pixel of the liquid crystal panel into three color dots of red, green and blue. Any three horizontally consecutive color dots may be used as a display unit to construct a clear lattice diagram for the character having tilted or curved strokes. The constructed clear lattice diagram is then stored in the main unit.

In a step 1320, the input device inputs the characters. In a step 1330, the process determines whether the input character has tilted or curved strokes. If the input character has tilted or curved strokes, the process goes to step 1340. Otherwise, the process goes to step 1350.

In the step 1340, the clear lattice diagram constructed in the step 1310 is used to control the liquid crystal display to display the input character. In the step 1350, the conventional/untreated lattice diagram previously stored in the main unit is used to control the liquid crystal display to display the input character, and the original physical pixels of the conventional lattice diagram is used to form the character.

It should be understood that, the clear lattice diagram may be constructed by one of the exemplary construction methods described above or any other construction methods, such as manual construction methods. In addition, it should also be understood that, in an exemplary embodiment, the clear lattice diagram is created beforehand and is stored in the storage medium. In another embodiment, the clear lattice diagram may also be constructed and created in real time when displaying the character.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method for controlling a liquid crystal panel to display a character having a tilted or curved stroke, the liquid crystal panel including a plurality of original physical pixels arranged in a matrix array, the method comprising:
   dividing each original physical pixel into three color dots of red, green and blue;
   forming a plurality of display units, wherein each display unit includes three horizontally consecutive color dots, and at least one of the plurality of display units includes color dots from two of the original physical pixels;
   constructing a lattice diagram including the plurality of display units for displaying the tilted or bended stroke, wherein the step of constructing the lattice diagram comprises using a plurality of straight line segments to construct the tilted or curved stroke, the plurality of straight line segments including at least one of: a first straight line segment with a slope of $$\frac{n \times h}{(n+2) \times w},$$

and a second straight line segment with a slope of $$\frac{m \times h}{(3m-1) \times w},$$

wherein h represents a height of each color dot, w represents a width of each color dot, n represents a total number of rows of the first straight line segment, and m represents a total number of rows of the second straight line segment; and
   driving the liquid crystal panel to display the character based on the lattice diagram, so that in the lattice diagram, at least two of the display units are vertically adjacent to each other and are horizontally offset by one or two color dots with respect to each other.

2. The method according to claim 1, further comprises comprising:
   obtaining an untreated lattice diagram of the tilted or curved stroke;
   shifting at least two of the original physical pixels which are vertically adjacent to each other and horizontally offset with respect to each other by at least three color dots, so that the offset distance is reduced to one or two color dots; and
   replacing at least one of the original physical pixels with the shifted pixels.

3. The method according to claim 1, wherein the lattice diagram is constructed and created in real time when displaying the character.

4. The method according to claim 1, wherein at least one of the plurality of display units is formed by three color dots of green, blue and red which are horizontally consecutively positioned in a sequence of green, blue and red color dots, or formed by three color dots which are horizontally consecutively positioned in a sequence of blue, red and green color dots.

5. The method according to claim 1, wherein the character is a Chinese character.

6. A display device, comprising:
a liquid crystal panel comprising a plurality of original physical pixels arranged in a matrix array; and
a display control unit configured to control the liquid crystal panel to display an input character having a tilted or curved stroke, wherein the display control unit configured to:
divide each original physical pixel into three color dots of red, green and blue;
use three horizontally consecutive positioned color dots to form each of a plurality of display units irrespective of whether the three color dots are from the same original physical pixel;
construct a lattice diagram including the plurality of display units for displaying the tilted or bended stroke, wherein the constructing step of the lattice diagram comprises using a plurality of straight line segments to construct the tilted or curved stroke in the lattice diagram, the plurality of straight line segments comprising at least one of: a first straight line segment with a slope of $$\frac{n \times h}{(n+2) \times w},$$

and a second straight line segment with a slope of $$\frac{m \times h}{(3m-1) \times w},$$

wherein h represents a height of each color dot, w represents a width of each color dot, n represents a total number of rows of the first straight line segment, and m represents a total number of rows of the second straight line segment; and
control the liquid crystal panel to display the character based on the lattice diagram, so that in the lattice diagram, at least two of the display units are vertically next to each other and are horizontally offset by at most two color dots with respect to each other.

7. The display device according to claim 6, wherein the display control unit is configured to perform the steps of:
obtaining an untreated lattice diagram of the tilted or curved stroke; and
shifting at least two of the original physical pixels which are vertically next to each other and horizontally offset with respect to each other by at least three color dots, so that the offset distance is reduced to at most two color dots.

8. The display device according to claim 6, wherein the lattice diagram is pre-created and is stored in a storage medium.

9. The display device according to claim 6, wherein the lattice diagram is created in real time when displaying the character.

10. The display device according claim 6, wherein at least one of the plurality of display units is formed by three color dots horizontally consecutively positioned in a sequence of green, blue and red color dots, or formed by three color dots horizontally consecutively positioned in a sequence of blue, red and green color dots.

11. The display device according to claim 6, wherein the input character is a Chinese character.

12. A method for using a computer system to display content, the computer system including a liquid crystal display, a main unit and an input system, the liquid crystal display having a plurality of original physical pixels arranged in a matrix array, each original physical pixel formed by three horizontally consecutive color dots of red, green, and blue, the method comprising steps of:
generating a lattice diagram, wherein the step of generating the lattice diagram comprises:
dividing each original physical pixel into three color dots of red, green and blue;
forming a plurality of display units, each display unit including three horizontally consecutive color dots, at least one of the plurality of display units including color dots from two of the original physical pixels;
using the plurality of display units to construct the lattice diagram, by using a plurality of straight line segments to construct the tilted or curved stroke in the lattice diagram, the plurality of straight line segments including at least one of: a first straight line segment with a slope of $$\frac{n \times h}{(n+2) \times w},$$

and a second straight line segment with a slope of $$\frac{m \times h}{(3m-1) \times w},$$

wherein h represents a height of each color dot, w represents a width of each color dot, n represents a total number of rows of the first straight line segment, and m represents a total number of rows of the second straight line segment; and
storing the constructed lattice diagram in the main unit of the computer system;
using the input system to input a character; and
determining whether the input character has a tilted or curved stroke, wherein the step of determining whether the input character has a titled or curved stroke comprises:
if the input character has a tilted or curved stroke, using the constructed lattice diagram to control the liquid crystal display to display the input character;
if the input character has no tilted or curved stroke, using an untreated lattice diagram stored in the main unit to control the liquid crystal display to display the input character, and using the original physical pixels of the untreated lattice diagram to form the character.

13. The method according to claim 12, wherein the step of generating the lattice diagram further comprises:
obtaining an untreated lattice diagram of the tilted or curved stroke; and
shifting at least two of the original physical pixels which are vertically next to each other and horizontally offset with respect to each other by at least three color dots, so that the offset distance is reduced to at most two color dots.

14. The method according claim 12, wherein the plurality of display units includes the display unit formed by three horizontally consecutively positioned color dots of green, blue and red.

15. The method according claim 12, wherein the plurality of display units includes the display unit formed by three horizontally consecutively positioned color dots of blue, red and green.

16. The method according to claim 12, wherein the input character is a Chinese character.

* * * * *